United States Patent
Zhang et al.

(10) Patent No.: US 9,998,611 B2
(45) Date of Patent: Jun. 12, 2018

(54) METHOD, DEVICE AND SYSTEM FOR IMPLEMENTING QUICK CHARGING

(71) Applicant: ZTE CORPORATION, Shenzhen, Guangdong Province (CN)

(72) Inventors: Xiaoliang Zhang, Shenzhen (CN); Yunan Zhang, Shenzhen (CN); Pan Ji, Shenzhen (CN); Lei Feng, Shenzhen (CN); Weishan Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days. days.

(21) Appl. No.: 15/518,770

(22) PCT Filed: Jul. 20, 2015

(86) PCT No.: PCT/CN2015/084518
§ 371 (c)(1),
(2) Date: Apr. 13, 2017

(87) PCT Pub. No.: WO2016/058426
PCT Pub. Date: Apr. 21, 2016

(65) Prior Publication Data
US 2017/0237864 A1    Aug. 17, 2017

(30) Foreign Application Priority Data
Oct. 16, 2014    (CN) .......................... 2014 1 0549031

(51) Int. Cl.
*H04B 1/38*      (2015.01)
*H04M 19/08*    (2006.01)
(Continued)

(52) U.S. Cl.
CPC ........... *H04M 19/08* (2013.01); *H01M 10/44* (2013.01); *H02J 7/00* (2013.01); *H02J 7/0003* (2013.01);
(Continued)

(58) Field of Classification Search
CPC ...... H04M 19/08; H01M 10/44; H02J 7/0045; H02J 7/0068
See application file for complete search history.

(56) References Cited

U.S. PATENT DOCUMENTS

| 6,946,817 B2 * | 9/2005 | Fischer | H02J 7/0027 320/107 |
| 2001/0012357 A1 * | 8/2001 | Mirashrafi | H04L 29/06 379/387.01 |

(Continued)

FOREIGN PATENT DOCUMENTS

| CN | 1877649 A | 12/2006 |
| CN | 103066340 A | 4/2013 |

(Continued)

OTHER PUBLICATIONS

Len Bherman,The Basics of USB Battery Charging: a Survival Guide, maxim integrated; Dec. 9, 2010. XP055047785.

(Continued)

*Primary Examiner* — Md Talukder
(74) *Attorney, Agent, or Firm* — Ling Wu; Stephen Yang; Ling and Yang Intellectual Property

(57) ABSTRACT

A method, a device and a system for implementing quick charging are provided. The method includes: a mobile terminal and a connected adapter respectively switching signal lines which extend into a charging interface to be connected with charging lines; and the adapter charging the mobile terminal with a set high-order power mode. The present disclosure uses the existing signal lines to thicken the charging lines, thereby the charging current is increased and the purpose of implementing quick charging is realized.

14 Claims, 4 Drawing Sheets

(51) Int. Cl.
    *H01M 10/44*     (2006.01)
    *H02J 7/00*     (2006.01)

(52) U.S. Cl.
    CPC .......... *H02J 7/0045* (2013.01); *H02J 7/0052* (2013.01); *H02J 7/0068* (2013.01); *H01M 2220/30* (2013.01); *H02J 7/0004* (2013.01); *H02J 7/0073* (2013.01); *H02J 2007/0039* (2013.01); *H02J 2007/0062* (2013.01); *H02J 2007/0096* (2013.01)

(56) References Cited

U.S. PATENT DOCUMENTS

| | | | | |
|---|---|---|---|---|
| 2003/0216075 | A1* | 11/2003 | Baker | H01R 24/84 439/310 |
| 2009/0100258 | A1* | 4/2009 | Sung | H04M 1/72527 713/100 |
| 2009/0102426 | A1 | 4/2009 | Liou et al. | |
| 2009/0184687 | A1* | 7/2009 | Schroeder | H01M 10/44 320/162 |
| 2011/0095722 | A1 | 4/2011 | Chang | |
| 2014/0141845 | A1* | 5/2014 | Li | H02J 7/0027 455/573 |
| 2014/0300321 | A1* | 10/2014 | Kim | H02J 7/0004 320/111 |
| 2015/0002079 | A1* | 1/2015 | Jeong | H02J 7/04 320/107 |
| 2015/0091499 | A1* | 4/2015 | Sun | H02J 7/0052 320/107 |
| 2016/0380458 | A1* | 12/2016 | Keates | H02J 7/0052 320/111 |
| 2016/0380462 | A1* | 12/2016 | Zhang | H02J 7/04 320/107 |
| 2017/0098944 | A1* | 4/2017 | Zhang | H02J 7/0029 |
| 2017/0158079 | A1* | 6/2017 | Lim | B60L 11/1861 |
| 2017/0237864 | A1* | 8/2017 | Zhang | H01M 10/44 455/573 |
| 2017/0256968 | A1* | 9/2017 | Yoon | H02J 7/0045 |

FOREIGN PATENT DOCUMENTS

| | | |
|---|---|---|
| CN | 103208661 A | 7/2013 |
| CN | 103545889 A | 1/2014 |
| EP | 2752958 A2 | 7/2014 |
| KR | 20030083323 A | 10/2003 |

OTHER PUBLICATIONS

USB Charging Port Controller and Power Switch with Load Detection, TPS2543,Texas Instruments,SLVSBA6—Feb. 2012. XP055389291.

* cited by examiner

METHOD, DEVICE AND SYSTEM FOR IMPLEMENTING QUICK CHARGING

TECHNICAL FIELD

The embodiment of the present disclosure relates to a mobile terminal application technology, in particular to a method, a device and a system for implementing quick charging.

BACKGROUND

Screens of smart mobile terminals increasingly become larger and capabilities of processors increasingly become stronger. As a result, electricity consumed by mobile terminals also increasingly becomes more. Although electric capacities of batteries are increased accordingly, demands of people for working time still cannot be satisfied. Since it is impossible for a battery technology, as a very fundamental technology, to make a breakthrough and develop rapidly, some manufacturers try to find some other ways to relieve the current problem. For example, quickly charging for the mobile terminals is a comparatively common solution.

At present, there are approximately two types of solutions for quick charging for mobile terminals. A charging speed depends on charging power, and the power is equal to voltage multiplying current. Therefore, the solutions for implementing quick charging may be implemented by increasing charging voltage or increasing charging current.

In solutions for quick charging by increasing current, by taking a Lightning charging interface of APPLE as an example, as compared with a Micro USB interface which is generally used in the industry, the Lightning interface has more pins which can be used for charging and thus a greater current can be provided. OPPO Company in China puts forward a VOOC quick charging solution. In this solution, two lines are added to a Micro USB interface for charging, and equivalently the charging current is increased. Due to the closeness of products of APPLE, the solution of APPLE is only usable for products of APPLE, other manufacturers cannot use the solution and consequently the solution cannot be generally used in the industry. Since special data lines need to be customized for products of OPPO, the generality of the solution is not enough.

However, in solutions for quick charging implemented by increasing voltage, such as Qualcomm Quick Charge 2.0 solution, since power is equal to square of voltage divided by resistance, when voltage is increased, power consumption is increased accordingly, produced heat will be also increased and a charger and a mobile terminal both will become hot during charging.

Therefore, a solution which not only is compatible with current Micro USB standard but also can better realize quick charging is needed, so as to satisfy demands of people for quick charging.

SUMMARY

In order to solve the above-mentioned technical problem, the embodiments of the present disclosure provide a method, a device and a system for implementing quick charging, which can provide a general quick charging solution to satisfy a quick charging demand.

In order to achieve the purpose of the embodiments of the present disclosure, an embodiment of the present disclosure provides a method for implementing quick charging, including the following steps:

a mobile terminal and a connected adapter respectively switching signal lines which extend into a charging interface to be connected with charging lines; and the adapter charging the mobile terminal with a set high-order power mode.

In an exemplary embodiment, in the method provided by the present disclosure, before the mobile terminal and the connected adapter perform signal line switching, the method further includes: the mobile terminal and the connected adapter performing function matching and triggering the signal line switching when the mobile terminal and the connected adapter both support a quick charging function.

In an exemplary embodiment, in the method provided by the present disclosure, the mobile terminal and the connected adapter performing function matching specifically includes:

the mobile terminal sending a matching signal to the connected adapter when the mobile terminal supports quick charging; and the adapter making a response to the received matching signal when the adapter supports quick charging.

In an exemplary embodiment, in the method provided by the present disclosure, the mobile terminal and the adapter respectively switching the signal lines which extend into the charging interface to be connected with the charging lines specifically includes:

the mobile terminal and the adapter respectively switching one of the signal lines which extend into the charging interface to be connected with a power line in the charging lines and switching another of the signal lines to be connected with a ground line in the charging lines.

In an exemplary embodiment, in the method provided by the present disclosure, the charging interface is a Micro USB interface; and An output rated current of the set high-order power is 2 A.

An embodiment of the present application further provides a mobile terminal, at least including:

a first line switching module configured to switch signal lines which extend into a charging interface to be connected with charging lines after an adapter is connected.

In an exemplary embodiment, the mobile terminal further includes:

a charging monitoring module configured to trigger a first function matching module when monitoring that the adapter is connected; and the first function matching module configured to send a matching signal to the adapter when the mobile terminal to which the first function matching module belongs supports quick charging, determine that the mobile terminal and the connected adapter both support a quick charging function when a response signal fed back by the adapter is received, and trigger the first line switching module.

In an exemplary embodiment, in the mobile terminal provided by the present disclosure, the first line switching module is specifically configured to switch one of the signal lines which extend into the charging interface to be connected with a power line in the charging lines and switch another of the signal lines to be connected with a ground line in the charging lines.

An embodiment of the present disclosure further provides an adapter, at least including:

a second line switching module configured to switch signal lines which extend into a charging interface to be connected with charging lines after the adapter is connected with a mobile terminal, and trigger a power switching module; and the power switching module configured to switch to a set high-order power mode for charging the mobile terminal.

In an exemplary embodiment, the adapter provided by the present disclosure further includes:

a second function matching module configured to determine that the mobile terminal supports a quick charging function when a matching signal sent by the mobile terminal is received, and make a response to the received matching signal when the adapter to which the second function matching module belongs supports the quick charging function, and trigger the second line switching module.

In an exemplary embodiment, in the adapter provided by the present disclosure, the second line switching module is specifically configured to switch one of the signal lines which extend into the charging interface to be connected with a power line in the charging lines and switch another of the signal lines to be connected with a ground line in the charging lines.

The embodiment of the present disclosure further provides a system for quick charging, including the mobile terminal and the adapter provided by the present disclosure.

The present disclosure has the following beneficial effects.

The present disclosure uses the existing signal lines to thicken the charging lines, thereby the charging current is increased and the purpose of implementing quick charging is realized. As compared with the current existing quick charging method, the charging lines have better generality and are compatible with both the existing other mobile terminals and chargers, and when a non-matching product is used, a common charging function can also be realized.

BRIEF DESCRIPTION OF DRAWINGS

The drawings described here are used for providing further understanding about the present disclosure and constitutes a part of the present application. The exemplary embodiments of the present disclosure and the description thereof are used for explaining the present disclosure instead of improperly limiting the present disclosure. In the drawings.

DETAILED DESCRIPTION

In order to make the purposes, technical solutions and advantages of the embodiments of the present disclosure to be more clearly understood, the embodiments of the present disclosure will be described below in detail with reference to the drawings. It needs to be stated that the embodiments in the present application and the features in the embodiments may be mutually and freely combined under the situation of no conflict.

Embodiment One

Figure 1:
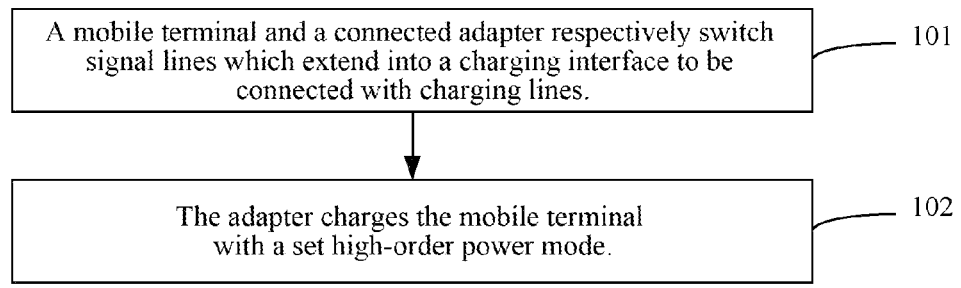
FIG. 1 illustrates a flowchart of a method for quick charging provided by the present disclosure.

The embodiment of the present disclosure provides a method for quick charging. As illustrated in FIG. 1, the method includes the following steps.

In step 101, a mobile terminal and a connected adapter respectively switch signal lines which extend into a charging interface to be connected with charging lines.

Specifically, in this step, before the mobile terminal and the connected adapter perform signal line switching, the mobile terminal and the connected adapter further need to perform function matching to intercommunicate about whether a quick charging function is supported. When the mobile terminal and the connected adapter both support the quick charging function, a signal line switching action is triggered.

Herein, a mode that the mobile terminal and the connected adapter perform function matching includes but not limited to the following: the mobile terminal sends a matching signal to the connected adapter when the mobile terminal supports quick charging; and the adapter makes a response to the received matching signal when the adapter supports quick charging.

In other words, the mobile terminal which supports quick charging would send a matching signal, and the adapter determines that the mobile terminal supports a quick charging function when the adapter receives the matching signal. Similarly, the adapter which supports quick charging would make a response to the matching signal, and the mobile terminal which receives a response signal determine that the adapter supports the quick charging function. After capability intercommunication, related configuration for quick charging can be performed.

Further, a connecting mode of the signal lines and the charge line in this step is as follow:

the mobile terminal switches one of the signal lines which extend into the charging interface to be connected with a power line in the charging lines and switches another of the signal lines to be connected with a ground line in the charging lines.

Similarly, the adapter switches one of the signal lines which extend into the charging interface to be connected with the power line in the charging lines and switches the other of the signal lines to be connected with the ground line in the charging lines.

In other words, the mobile terminal and the adapter temporarily switch DATA lines in a charging data lines to be charging lines and merge the charging lines into original charging lines to thicken the charging lines and increase the charging current.

Further, in this step, when it is found that one of the mobile terminal and the adapter does not support the quick charging function after the mobile terminal and the adapter perform function matching, it is to exit this process, charging is performed according to a common charging mode only and no line switching setting needs to be performed.

In step 102, the adapter charges the mobile terminal with a set high-order power mode.

Since the charging lines are thickened in step 101, the current charging lines can bear greater charging current, and at this moment, the adapter is switched to a set high-order power to charge the mobile terminal, so as to achieve the effect of quick charging.

In this step, an output current of the set high-order power may be but not limited to 2 A.

To sum up, it can be seen that the quick charging method provided by the present disclosure uses the existing signal lines to thicken the charging lines, thereby the charging current is increased and the purpose of implementing quick charging is realized. As compared with the current existing quick charging method, the charging lines have better generality and are compatible with both the existing other mobile terminals and chargers, and when a non-matching product is used, a common charging function can also be realized.

In order to more clearly describe the implementation process of the method provided by the present disclosure, an alternative embodiment of the present disclosure is provided below, and the technical details of the prevent invention are further provided in combination with the description of the embodiment such that the specific implementation process of the method provided by the present disclosure can be better described.

Figure 2:
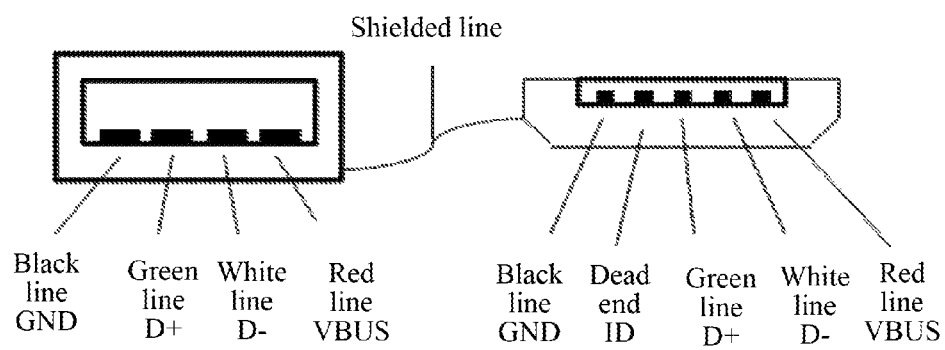
FIG. 2 illustrates a schematic diagram of a data line interface in the present disclosure.

In this embodiment, it is supposed that a mobile terminal and a connected adapter both support a quick charging function, a charging interface used by the mobile terminal and the adapter is a Micro USB interface which is comparatively commonly used at present. A left side of FIG. 2 illustrates a diagram of a data line interface of an adapter and a right side of FIG. 2 illustrates a diagram of a data line interface of a mobile terminal.

When the method in this embodiment uses the adapter for charging, after the adapter successfully matches with the mobile terminal, the adapter and the mobile terminal respectively merge D+ lines and D− lines into Vbus and GND lines, so as to increase maximum safety current which is allowable to pass through the charging lines to implement quick charging. A specific operation flow is as follow.

The mobile terminal monitors that Vbus voltage of the Micro USB interface changes, and judges whether the mobile terminal is in a charging state.

After the mobile terminal is in the charging state, the mobile terminal uses D+ and D− signal lines to send a matching signal to the charging adapter, the adapter continuously scans the D+ and D− signal lines and sends a matching success signal to the mobile terminal after the matching signal sent by the mobile terminal is received, and the matching succeeds after the mobile terminal receives the matching success signal returned by the adapter.

After the matching succeeds, the mobile terminal disconnects a D+ signal line in the Micro USB interface from a data line of a mobile terminal processor and connects the D+ signal line with a Vbus line in the Micro USB interface to achieve a function of thickening the Vbus line, and disconnects a D− signal line in the Micro USB interface from the data line of the mobile terminal processor and connects the D− signal line with a GND line in the Micro USB interface to achieve a function of thickening the GND line; and at the same time, the adapter disconnects a D+ signal line in the Micro USB interface from a data line of an adapter processor and connects the D+ signal line with a Vbus line in the Micro USB interface to achieve a function of thickening the Vbus line, and disconnects a D− signal line in the Micro USB interface from the data line of the adapter processor and connects the D− signal line with a GND line in the Micro USB interface to achieve a function of thickening the GND line.

Herein, connecting the D+ signal line with the Vbus line and connecting the D− signal line with the GND line are just one connecting mode. When designing, the D+ signal line may be connected with the GND and the D− signal line may be connected with the Vbus line.

Further, after the adapter performs line switching, the adapter is switched to a set high-order power mode and the output rated current is 2 A to realize quick charging. However, when the adapter and the mobile terminal do not successfully match, i.e., at least one of the adapter and the mobile terminal does not support the quick charging function, the adapter performs charging according to a common charging mode, i.e., the output rated current is 1 A to guarantee the safety in use.

Embodiment Two

Figure 3:
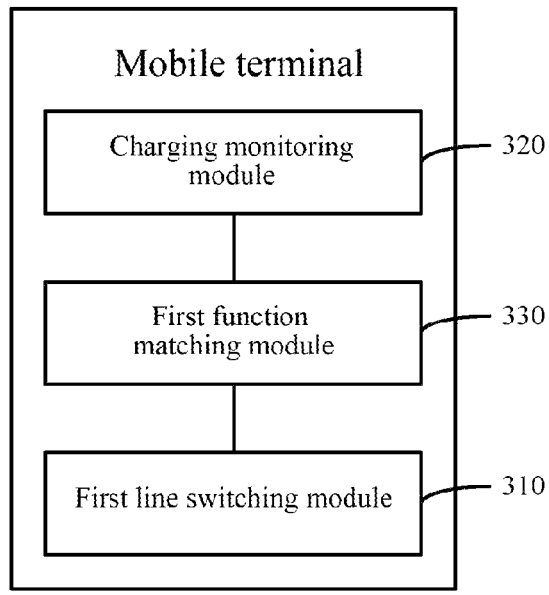
FIG. 3 illustrates a structural diagram of a mobile terminal provided by the present disclosure.

As illustrated in FIG. 3, the embodiment of the present disclosure provides a mobile terminal, such as a mobile phone or a tablet computer. In this embodiment, in order to cooperate with an adapter to implement quick charging, the mobile terminal is added with a first line switching module 310 configured to switch signal lines which extend into a charging interface to be connected with charging lines after the adapter is connected.

Further, the mobile terminal in this embodiment further includes a charging monitoring module 320 and a first function matching module 330, which are used for cooperating with the first line switching module 310 to implement quick charging.

Specifically, the charging monitoring module 320 is configured to trigger the first function matching module 330 when monitoring that the adapter is connected; and the first function matching module 330 is configured to send a matching signal to the adapter when the mobile terminal supports quick charging, determine that the mobile terminal and the connected adapter both support a quick charging function when a response signal fed back by the adapter is received, and trigger the first line switching module 310.

Herein, the charging monitoring module 320 is specifically configured to judge whether the mobile terminal is in a charging state by monitoring Vbus voltage of the charging interface (Micro USB interface), and determine that the adapter is connected when the mobile terminal is in the charging state.

Further, in this embodiment, the first line switching module 310 is specifically configured to switch one of the signal lines which extend into the charging interface to be connected with a power line in the charging lines and switch the other of the signal lines to be connected with a ground line in the charging lines.

As exemplarily described below, when the charging interface of the mobile terminal is a Micro USB interface, the first line switching module 320 disconnects a D+ signal line in the Micro USB interface from a data line of a mobile terminal processor and connects the D+ signal line with a Vbus line in the Micro USB interface to achieve a function of thickening the Vbus line, and disconnects a D− signal line in the Micro USB interface from the data line of the mobile terminal processor and connects the D− signal line with a GND line in the Micro USB interface to achieve a function of thickening the GND line.

Embodiment Three

Figure 4:
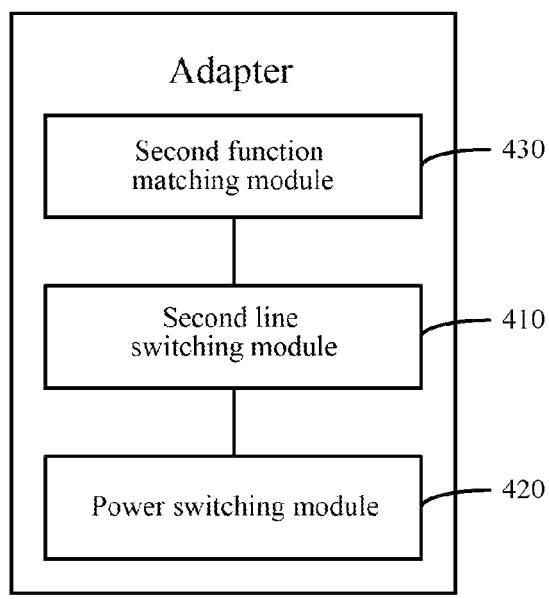
FIG. 4 illustrates a structural diagram of an adapter provided by the present disclosure.

The embodiment of the present disclosure provides an adapter. As illustrated in FIG. 4, the adapter includes: a second line switching module 410 configured to switch signal lines which extend into a charging interface to be connected with charging line after the adapter is connected with a mobile terminal, and trigger a power switching module; and the power switching module 420 configured to switch to a set high-order power mode for charging the mobile terminal.

Further, the adapter in this embodiment further includes a second function matching module 430 which is used for cooperating with the second line switching module 410 to implement quick charging.

Specifically, the second function matching module 430 is configured to determine that the mobile terminal supports a quick charging function when a matching signal sent by the mobile terminal is received, and make a response to the received matching signal when the adapter to which the second function matching module belongs supports the quick charging function, and trigger the second line switching module 410.

Further, in this embodiment, the second line switching module 410 is specifically configured to switch one of the signal lines which extend into the charging interface to be connected with a power line in the charging lines and switch the other of the signal lines to be connected with a ground line in the charging lines.

As exemplarily described below, when the charging interface of the adapter is a Micro USB interface, the second line switching module 410 disconnects a D+ signal line in the Micro USB interface from a data line of an adapter processor and connects the D+ signal line with a Vbus line in the Micro USB interface to achieve a function of thickening the Vbus line, and disconnects a D− signal line in the Micro USB interface from the data line of the adapter processor and connects the D− signal line with a GND line in the Micro USB interface to achieve a function of thickening the GND line.

Further, in this embodiment, the power switching module 420 is specifically configured to switch to an output rated current, i.e., 2 A, of the high-order power mode.

Aiming at the structural description of the principle in embodiment 3 and embodiment 4, the specific implementation process of the present disclosure will be described below in detail with reference to the specific drawings from an angle of a specific module.

Figure 5:
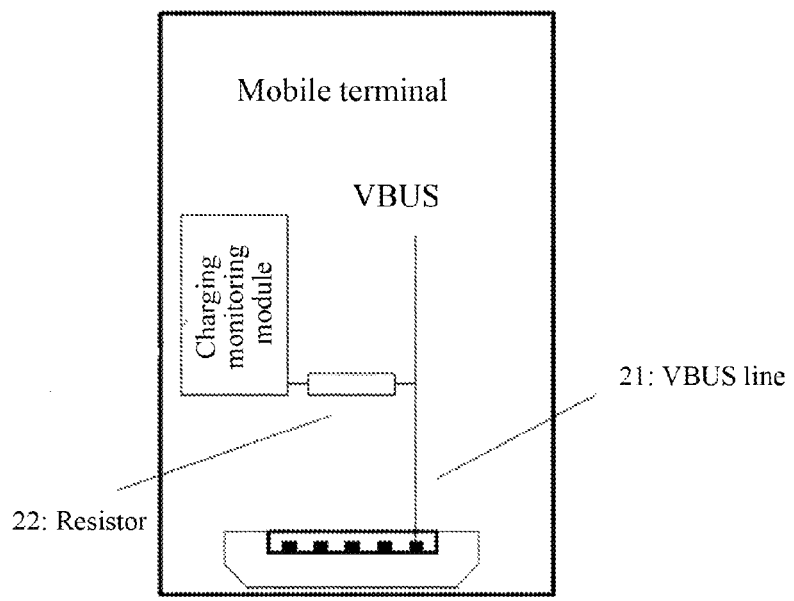
FIG. 5 illustrates a diagram of a principle of a charging detection module in the present disclosure.

FIG. 5 illustrates a diagram of a working principle of the charging detection module 320. In FIG. 5, 21 represents a Vbus line, 22 represents a high-resistance resistor (e.g., 100 Kohm), the charging monitoring module 320 continuously scans Vbus voltage to judge a charging state, and when Vbus voltage reaches a charging voltage, the mobile terminal is in the charging state.

Figure 6:
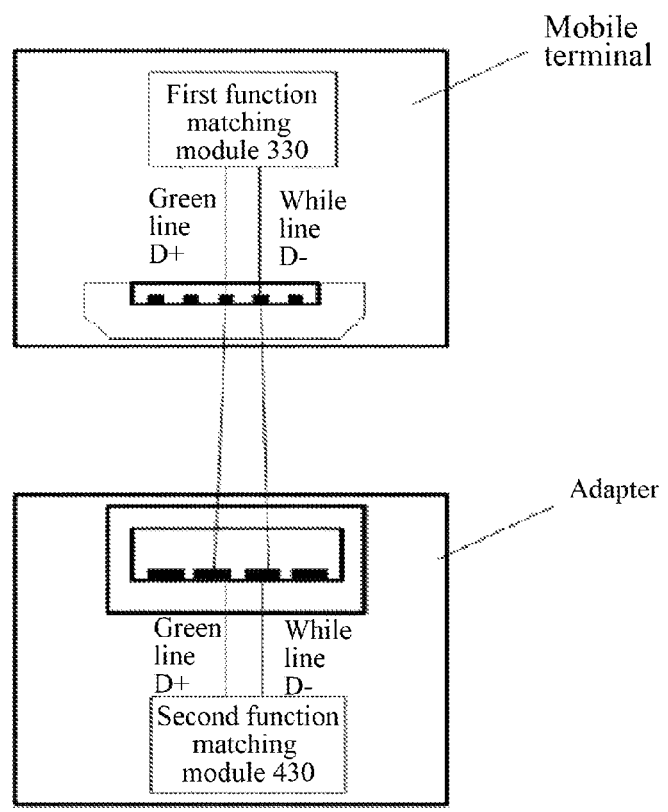
FIG. 6 illustrates a diagram of a principle of function matching between a mobile terminal and an adapter.

FIG. 6 illustrates a diagram of a principle of function matching between the first function matching module 330 and the second function matching module 430. Specifically, after the charging monitoring module 320 of the mobile terminal monitors that the charging voltage is reached, the first function matching module 330 of the mobile terminal uses D+ and D− lines of data lines to send a matching signal to the second matching module 430 of the adapter, and the second function matching module 430 of the adapter returns a matching success signal after the matching signal is received.

Figure 7:
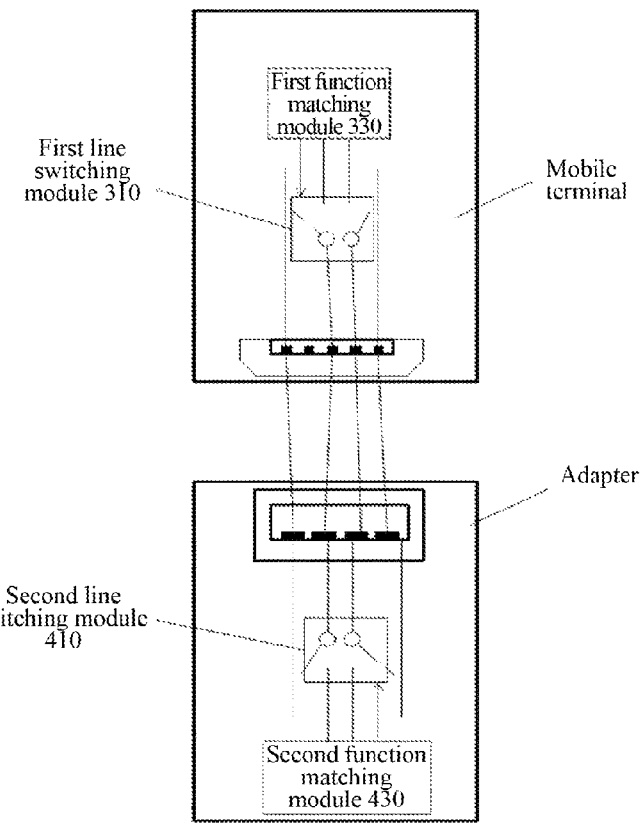
FIG. 7 illustrates a diagram of a principle of line switching between a mobile terminal and an adapter.

FIG. 7 illustrates a diagram of a principle of line switching between the first line switching module 310 and the second line switching module 410. Specifically, when the mobile terminal and the adapter successfully match, the first line switching module 310 of the mobile terminal disconnects a D+ signal line in the Micro USB interface from a data line of a mobile terminal processor and connects the D+ signal line with a Vbus line in the Micro USB interface to achieve a function of thickening the Vbus line, and disconnects a D− signal line in the Micro USB interface from the data line of the mobile terminal processor and connects the D− signal line with a GND line in the Micro USB interface to achieve a function of thickening the GND line.

At the same time, the second line switching module 410 of adapter disconnects a D+ signal line in the Micro USB interface from a data line of an adapter processor and connects the D+ signal line with a Vbus line in the Micro USB interface to achieve a function of thickening the Vbus line, and disconnects a D− signal line in the Micro USB interface from the data line of the adapter processor and connects the D− signal line with a GND line in the Micro USB interface to achieve a function of thickening the GND line.

Figure 8:
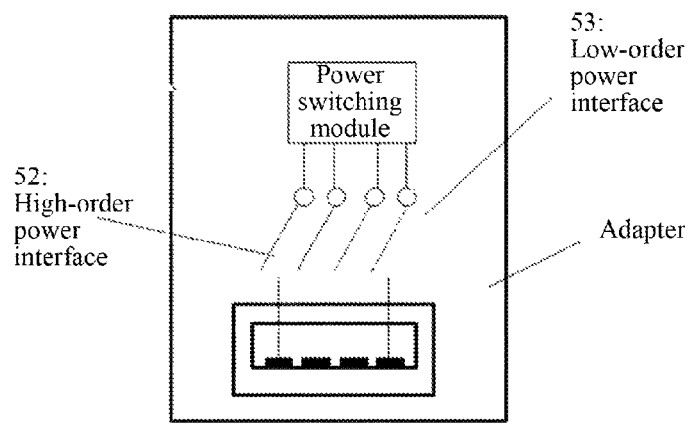
FIG. 8 illustrates a diagram of a principle of a power switching module of an adapter in the present disclosure.

FIG. 8 illustrates a diagram of a principle of mode switching performed by the power switching module 420 of the adapter. In FIG. 8, 52 represents a high-order power interface, 53 represents a low-order power interface, the power switching module 420 switches the power of the adapter to the high-order power after the matching performed by the second function matching module succeeds, and an output rated current is 2 A; and if the matching performed by the matching module does not succeed, the power switching module 420 switches the power of the adapter to the low-order power and the output rated current is 1 A to guarantee the safety in use.

To sum up, it can be seen that the present disclosure uses the existing signal lines to thicken the charging lines, thereby the charging current is increased and the purpose of implementing quick charging is realized. As compared with the current existing quick charging method, the charging lines have better generality and are compatible with both the existing other mobile terminals and chargers, and when a non-matching product is used, a common charging function can also be realized.

Embodiment Four

The embodiment of the present disclosure provides a system for quick charging, including the mobile terminal in embodiment two and the adapter in embodiment three.

Since the system in this embodiment includes the mobile terminal in embodiment two and the adapter in embodiment three, naturally the system also has the corresponding technical effects of embodiment two and embodiment three.

Obviously, one skilled in the art may make various modifications and variations to the present disclosure without departing from the essence and scope of the present disclosure. Therefore, if these modifications and variations made to the present disclosure are included in the scope of the claims of the present disclosure and the equivalent technique thereof, the present disclosure is also intended to cover these modifications and variations.

INDUSTRIAL APPLICABILITY

According to the method, the device and the system for implementing quick charging provided by the embodiments of the present disclosure, the method includes the following steps: a mobile terminal and a connected adapter respectively switching signal lines which extend into a charging interface to be connected with charging lines; and the adapter charging the mobile terminal with a set high-order power mode. The present disclosure uses existing signal lines to thicken charging lines, thereby the charging current is increased and the purpose of implementing quick charging is realized.

What is claimed is:

1. A method for implementing quick charging, comprising:

switching, by a mobile terminal and a connected adapter, respectively signal lines which extend into a charging interface to be connected with charging lines; and charging, by the adapter, the mobile terminal with a set high-order power mode, wherein, before the mobile terminal and the connected adapter perform signal line switching, the method further comprises:

performing, by the mobile terminal and the connected adapter, function matching to intercommunicate about whether a quick charging function is supported, and triggering the signal line switching after the mobile terminal receives a matching success signal returned by the adapter, wherein performing, by the mobile terminal and the connected adapter, function matching specifically comprises:

the mobile terminal monitoring that Vbus voltage of an Micro USB interface changes when the mobile terminal supports quick charging, judging whether the mobile terminal is in a charging state, and sending, using D+ and D− signal lines, a matching signal to the connected adapter; and the adapter scanning the D+ and D− signal lines continuously when the adapter supports quick charging, making a response to the received matching signal and sending the matching success signal to the mobile terminal after the matching signal sent by the mobile terminal is received.

2. The method according to claim 1, wherein, switching, by the mobile terminal and the adapter, respectively the signal lines which extend into the charging interface to be connected with the charging lines specifically comprises:

switching, by the mobile terminal and the adapter, respectively one of the signal lines which extend into the charging interface to be connected with a power line in the charging lines and another of the signal lines to be connected with a ground line in the charging lines.

3. The method according to claim 2, wherein the charging interface is a Micro USB interface; and an output rated current of the set high-order power is 2 A.

4. The method according to claim 1, wherein the charging interface is a Micro USB interface; and an output rated current of the set high-order power is 2 A.

5. The method according to claim 1, wherein, switching, by the mobile terminal and the adapter, respectively the signal lines which extend into the charging interface to be connected with the charging lines specifically comprises:

switching, by the mobile terminal and the adapter, respectively one of the signal lines which extend into the charging interface to be connected with a power line in the charging lines and another of the signal lines to be connected with a ground line in the charging lines.

6. The method according to claim 1, wherein the charging interface is a Micro USB interface; and an output rated current of the set high-order power is 2 A.

7. The method according to claim 1, wherein the charging interface is a Micro USB interface; and an output rated current of the set high-order power is 2 A.

8. A mobile terminal, at least comprising:

a first line switching module, configured to switch signal lines which extend into a charging interface to be connected with charging lines after an adapter is connected, a charging monitoring module, configured to trigger a first function matching module when monitoring that the adapter is connected, wherein the charging monitoring module judges whether the mobile terminal is in a charging state by monitoring Vbus voltage of an Micro USB interface, and determines that the adapter is connected when the mobile terminal is in the charging state; and the first function matching module, configured to send a matching signal using D+ and D− lines of data lines to the adapter when the mobile terminal to which the first function matching module belongs supports quick charging and the mobile terminal is in the charging state, determine that the mobile terminal and the connected adapter both support a quick charging function when a response signal fed back by the adapter is received, and trigger the first line switching module.

9. The mobile terminal according to claim 8, wherein the first line switching module is specifically configured to switch one of the signal lines which extend into the charging interface to be connected with a power line in the charging lines and switch another of the signal lines to be connected with a ground line in the charging lines.

10. A system for quick charging, comprising the mobile terminal according to claim 8 and an adapter which at least comprises: a second line switching module, configured to switch signal lines which extend into a charging interface to be connected with charging lines after the adapter is connected with a mobile terminal, and trigger a power switching module; the power switching module, configured to switch to a set high-order power mode for charging the mobile terminal; and a second function matching module, configured to determine that the mobile terminal supports a quick charging function when a matching signal sent by the mobile terminal is received, and make a response to the received matching signal when the adapter to which the second function matching module belongs supports the quick charging function and the adapter continuously scans D+ and D− signal lines, and trigger the second line switching module.

11. The mobile terminal according to claim 8, wherein the first line switching module is specifically configured to switch one of the signal lines which extend into the charging interface to be connected with a power line in the charging lines and switch another of the signal lines to be connected with a ground line in the charging lines.

12. An adapter, at least comprising:

a line switching module, configured to switch signal lines which extend into a charging interface to be connected with charging lines after the adapter is connected with a mobile terminal, and trigger a power switching module;

the power switching module, configured to switch to a set high-order power mode for charging the mobile terminal, and a function matching module, configured to perform function matching to intercommunicate about whether a quick charging function is supported and determine that the mobile terminal supports a quick charging function when a matching signal sent by the mobile terminal is received, and respond to the received matching signal to the mobile terminal with a matching success signal to trigger the signal line switching after the mobile terminal receives the matching success signal when the adapter supports the quick charging function; and the adapter continuously scans D+ and D− signal lines, and trigger the line switching module;

wherein, the mobile terminal sending the matching signal to the adapter comprises:

the mobile terminal monitoring that Vbus voltage of an Micro USB interface changes when the mobile terminal supports quick charging, judging whether the mobile terminal is in a charging state, and sending, using D+ and D− signal lines, the matching signal to the connected adapter.

13. The adapter according to claim 12, wherein the second line switching module is specifically configured to switch one of the signal lines which extend into the charging interface to be connected with a power line in the charging lines and switch another of the signal lines to be connected with a ground line in the charging lines.

14. The adapter according to claim 12, wherein the second line switching module is specifically configured to switch one of the signal lines which extend into the charging interface to be connected with a power line in the charging lines and switch another of the signal lines to be connected with a ground line in the charging lines.

* * * * *